(12) United States Patent
Ruiz

(10) Patent No.: US 8,456,780 B1
(45) Date of Patent: Jun. 4, 2013

(54) UNCOUPLED PIEZOELECTRIC MILLI-ACTUATOR ASSEMBLY

(75) Inventor: Oscar Ruiz, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/370,947

(22) Filed: Feb. 10, 2012

(51) Int. Cl.
*G11B 21/10* (2006.01)

(52) U.S. Cl.
USPC ........................................ 360/294.4

(58) Field of Classification Search
USPC ................................ 360/294.4, 244.5, 245.8
See application file for complete search history.

(56) References Cited

U.S. PATENT DOCUMENTS

| | | | | |
|---|---|---|---|---|
| 6,268,983 | B1* | 7/2001 | Imada et al. | 360/294.3 |
| 6,297,936 | B1* | 10/2001 | Kant et al. | 360/294.4 |
| 6,310,750 | B1* | 10/2001 | Hawwa et al. | 360/294.6 |
| 6,404,600 | B1* | 6/2002 | Hawwa et al. | 360/294.4 |
| 6,421,211 | B1* | 7/2002 | Hawwa et al. | 360/294.4 |
| 6,501,625 | B1 | 12/2002 | Boismier et al. | |
| 6,594,104 | B2* | 7/2003 | Tokuyama et al. | 360/78.02 |
| 6,661,619 | B2* | 12/2003 | Nishida et al. | 360/294.4 |
| 6,741,012 | B2 | 5/2004 | Koganezawa et al. | |
| 6,930,860 | B1* | 8/2005 | Coffey | 360/294.4 |
| 7,023,667 | B2 | 4/2006 | Shum | |
| 7,035,055 | B2* | 4/2006 | Kikkawa et al. | 360/265.9 |
| 7,167,344 | B2* | 1/2007 | Nakagawa et al. | 360/294.4 |
| 7,983,008 | B2* | 7/2011 | Liao et al. | 360/294.4 |
| 8,144,436 | B2* | 3/2012 | Iriuchijima et al. | 360/294.4 |
| 8,149,542 | B2* | 4/2012 | Ando | 360/245.8 |
| 8,199,442 | B2* | 6/2012 | Okawara et al. | 360/294.4 |
| 8,248,731 | B2* | 8/2012 | Fuchino | 360/245.8 |
| 8,248,735 | B2* | 8/2012 | Fujimoto et al. | 360/294.4 |
| 8,331,060 | B2* | 12/2012 | Kashima | 360/294.4 |
| 8,331,061 | B2* | 12/2012 | Hanya et al. | 360/294.4 |
| 8,335,054 | B2* | 12/2012 | Kashima | 360/294.4 |
| 8,335,055 | B2* | 12/2012 | Hanya et al. | 360/294.4 |
| 2002/0034033 | A1 | 3/2002 | Kang et al. | |
| 2010/0085663 | A1* | 4/2010 | Ando et al. | 360/244.2 |
| 2011/0211274 | A1* | 9/2011 | Kuwajima | 360/71 |

FOREIGN PATENT DOCUMENTS

JP 11185415 7/1999

OTHER PUBLICATIONS

"Sandwitch-type PZT mount structure for Milli actuator", http://ip.com/IPCOM/000192875, (Feb. 5, 2010), 1.

* cited by examiner

*Primary Examiner* — Allen T Cao (57) ABSTRACT

An actuator arm for a hard-disk drive (HDD) is disclosed. A piezoelectric element is disposed within a well of an actuator arm. The piezoelectric element is aligned with a neutral axis of the actuator arm.

18 Claims, 6 Drawing Sheets

UNCOUPLED PIEZOELECTRIC MILLI-ACTUATOR ASSEMBLY

TECHNICAL HELD

Embodiments relate generally to the field of hard-disk drives (HDDs), and in particular to actuator arms for HDDs.

BACKGROUND

As hard-disk drive (HDD) storage capacity increases, the width of tracks for recording data is decreasing. In order to read and write data accurately, a magnetic head must be precisely positioned on narrow tracks. One method for positioning the magnetic head more precisely utilizes piezoelectric elements to implement minute changes in the position of the magnetic head. However, these piezoelectric elements can implement unwanted change of the geometry of the actuator arm holding the magnetic head in more than one plane of motion. This complicates precisely controlling the movement and positioning of the magnetic head. For example, while the piezoelectric element is configured to implement changes in the actuator arm assembly in a horizontal plane of motion, it often also implements unwanted changes to the fly-height of the magnetic head as well. As a result, the hard-disk drive has to go through a cycle of adjusting the positioning of the magnetic head, including the fly-height, to account for the additional out-of-plane motion. This increases the time it takes to seek a particular data track on the disk-drive.

SUMMARY

An actuator arm for a hard-disk drive (HDD) is disclosed. A piezoelectric element is disposed within a well of an actuator arm. The piezoelectric element is aligned with a neutral axis of the actuator arm.

DESCRIPTION OF THE DRAWINGS

The accompanying drawings, which are incorporated in and form a part of this specification, illustrate embodiments and, together with the description, serve to explain the embodiments. The drawings referred to in this description should not be understood as being drawn to scale except if specifically noted.

DESCRIPTION OF EMBODIMENTS

Reference will now be made in detail to various alternative embodiments. While numerous alternative embodiments will be described, it will be understood that they are not intended to be limiting. On the contrary, the described embodiments are intended to cover alternatives, modifications and equivalents, which may be included within the spirit and scope as defined by the appended claims.

Furthermore, in the following description of embodiments, numerous specific details are set forth in order to provide a thorough understanding. However, it should be appreciated that embodiments may be practiced without these specific details. In other instances, well known methods, procedures, and components have not been described in detail as not to unnecessarily obscure embodiments. Throughout the drawings, like components are denoted by like reference numerals, and repetitive descriptions are omitted for clarity of explanation if not necessary.

Figure 1:
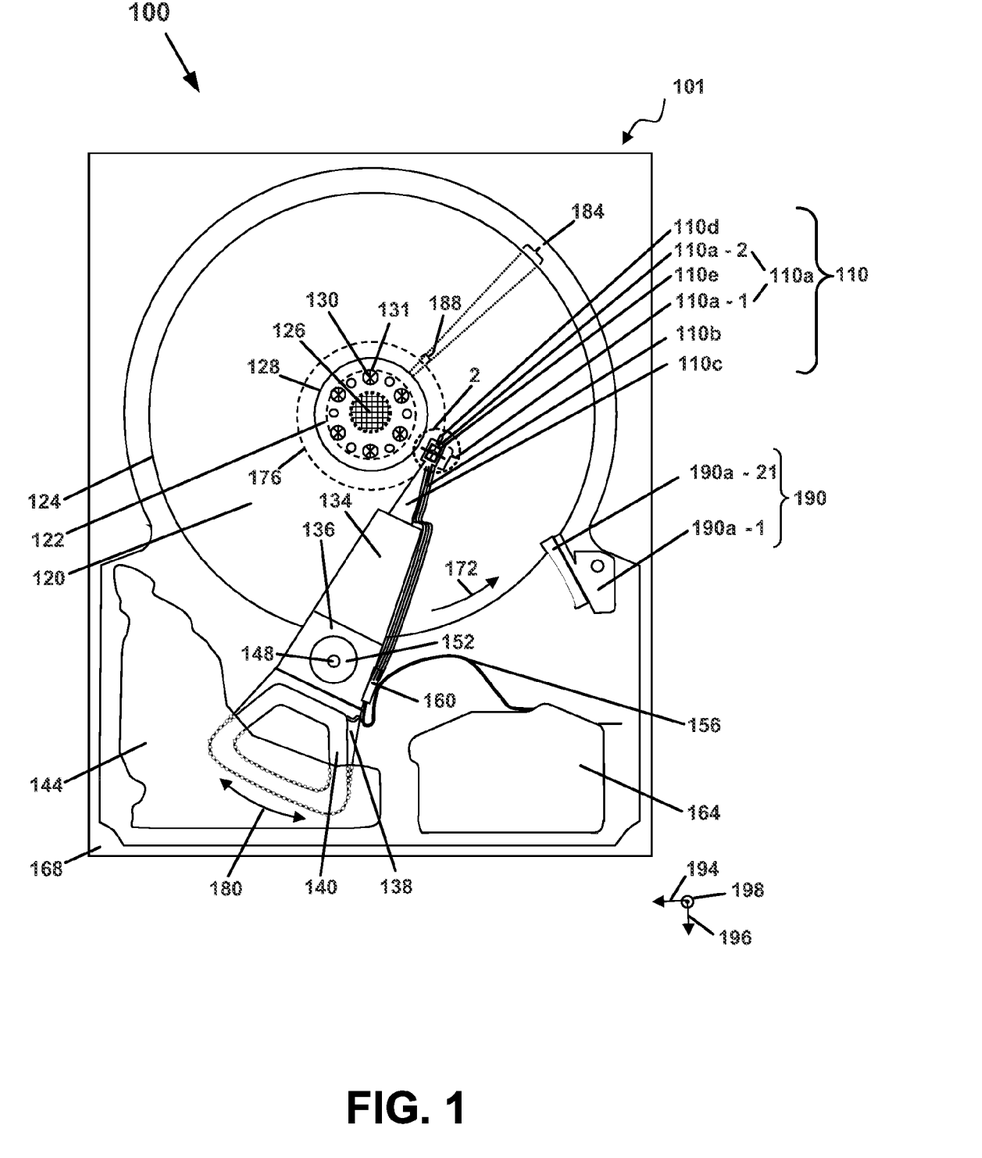
FIG. 1 is a plan view of a hard-disk drive (HDD), in accordance with one or more embodiments.

Physical Description of Embodiments of an Uncoupled Piezoelectric Milli-Actuator Assembly With further reference to FIG. 1, in accordance with one or more embodiments, the arrangement of components within HDD 101 is illustrated. HDD 101 includes a HGA 110 comprising a gimbal 110e, a head-slider 110a, and a plurality of suspension-lead pads (not shown). The head-slider 110a includes a slider 110a-1, and a magnetic-recording head 110a-2 coupled with the slider 110a-1. The HGA 110 further includes a lead-suspension 110b attached to the head-slider 110a, and a load beam 110c attached to a head-slider 110a, which includes the magnetic-recording head 110a-2 at a distal end of the head-slider 110a. The head-slider 110a is attached at the distal end of the load beam 110c to the gimbal 110e, which is attached to the load beam 110c. HDD 101 also includes at least one magnetic-recording disk 120 rotatably mounted on a spindle 126 and a spindle motor (not shown) mounted in a disk-enclosure base 168 and attached to the spindle 126 for rotating the magnetic-recording disk 120. Thus, the HGA 110 also includes a tongue 110d, which is used in loading and unloading the head-slider 110a from the magnetic-recording disk 120, using a load-unload ramp structure 190 including a load-unload ramp 190a-21 and bracket 190a-1. The magnetic-recording disk has an inside-diameter edge 122, and an outside-diameter edge 124, which are often informally referred in as the inside-diameter and the outside diameter, it being understood that these terms of art refer to the corresponding portion of the disk. The magnetic-recording head 110a-2 that includes a write element 110a-21, a so-called writer, and a read element 110a-22, a so-called reader, is disposed for respectively writing and reading information, referred to by the term of art, "data," stored on the magnetic-recording disk 120 of HDD 101. The magnetic-recording disk 120, or a plurality (not shown) of magnetic-recording disks, may be affixed to the spindle 126 with a disk clamp 128. The disk clamp 128 is provided with fastener holes, for example, fastener hole 130, and clamps the magnetic-recording disk 120, or magnetic recording disks (not shown), to a hub (not shown) with fasteners, of which fastener 131 is an example, HDD 101 further includes an actuator arm 134 attached to HGA 110, a carriage 136, a voice-coil motor (VCM) that includes an armature 138 including a voice coil 140 attached to the carriage 136; and a stator 144 including a voice-coil magnet (not shown); the armature 138 of the VCM is attached to the carriage 136 and is configured to move the actuator arm 134 and HGA 110 to access portions of the magnetic-recording disk 120, as the carriage 136 is mounted on a pivot-shaft 148 with an interposed pivot-bearing assembly 152.

With further reference to FIG. 1, in accordance with one or more embodiments, electrical signals, for example, current to the voice coil 140 of the VCM, write signals to and read signals from the magnetic-recording head 110a-2, are provided by a flexible cable 156. Interconnection between the flexible cable 156 and the magnetic-recording head 110a-2 may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by the disk-enclosure base 168. The disk-enclosure base 168, also referred to as a base casting, depending upon whether the disk-enclosure base 168 is cast, in conjunction with an HDD cover (not shown) provides a sealed, except for a breather filter (not shown), protective disk enclosure for the information storage components of HDD 101.

With further reference to FIG. 1, in accordance with one or more embodiments, other electronic components (not shown), including a disk controller and servo electronics including a digital-signal processor (DSP), provide electrical signals to the spindle motor, the voice coil 140 of the VCM and the magnetic-recording head 110a-2 of HGA 110. The electrical signal provided to the spindle motor enables the spindle motor to spin providing a torque to the spindle 126 which is in turn transmitted to the magnetic-recording disk 120 that is affixed to the spindle 126 by the disk clamp 128; as a result, the magnetic-recording disk 120 spins in direction 172. The spinning magnetic-recording disk 120 creates an airflow including an air-stream, and a self-acting air bearing on which the air-bearing surface (ABS) of the head-slider 110a rides so that the head-slider 110a flies in proximity with the recording surface of the magnetic-recording disk 120 to avoid contact with a thin magnetic-recording medium of the magnetic-recording disk 120 in which information is recorded. The electrical signal provided to the voice coil 140 of the VCM enables the magnetic-recording head 110a-2 of HGA 110 to access a track 176 on which information is recorded. As used herein, "access" is a term of art that refers to operations in seeking the track 176 of the magnetic-recording disk 120 and positioning the magnetic-recording head 110a-2 on the track 176 for both reading data from, and writing data to, the magnetic-recording disk 120. The armature 138 of the VCM swings through an arc 180 which enables HGA 110 attached to the armature 138 by the actuator arm 134 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element 110a-22 of the magnetic-recording head 110a-2 of HGA 110 reads the servo-burst-signal pattern which provides a position-error-signal (PES) to the servo electronics, which controls the electrical signal provided to the voice coil 140 of the VCM, enabling the magnetic-recording head 110a-2 to follow the track 176. Upon finding the track 176 and identifying a particular sectored track portion 188, the magnetic-recording head 110a-2 either reads data from the track 176, or writes data to the track 176 depending on instructions received by the disk controller from an external agent, for example, a microprocessor of a computer system.

As shown in FIG. 1, the direction of arrow 196 is about parallel to the long side of the disk-enclosure base 168 of HDD 101; the direction of arrow 194 is perpendicular to arrow 196 and is about parallel to the short side of the disk-enclosure base 168 of HDD 101; and, arrow 198, which is indicated by the arrow head of arrow 198, is about perpendicular to the plane of the disk-enclosure base 168, as well as the plane of the recording surface of the magnetic recording disk 120, and therefore is perpendicular to arrows 194 and 196. Thus, the triad of arrows 194, 196 and 198 are related to one another by the right-hand rule for vectors in the direction of the arrows 194, 196 and 198 such that the cross product of the vector corresponding to arrow 194 and the vector corresponding to arrow 196 produces a vector parallel and oriented in the direction of the arrow 198. The triad of arrows 194, 196 and 198 is subsequently used to indicate the orientation of views for subsequently described drawings of HGA 110. Also as shown in FIG. 1, a reference circle 2 is provided to indicate the portion of the HGA 110 subsequently described in the discussion of FIG. 2.

As used herein, component parts of HDD 101 have different sides referred to by at least the following terms of art: a side facing into the direction 172 of motion of the magnetic-recording disk and, thus, into the direction of airflow, a leading-edge (LIE) side; a side facing away from the direction 172 of motion of the magnetic-recording disk and, thus, away from the direction of airflow, a trailing-edge (TIE) side.

As described above with reference to FIG. 1 embodiments encompass within their scope a HDD 101 that includes a magnetic-recording disk 120, a disk enclosure including a disk-enclosure base 168, a spindle motor affixed in the disk-enclosure base 168, for rotating the magnetic-recording disk 120, an actuator arm 134, and a HGA 110 attached to the actuator arm 134. In accordance with one or more embodiments, the HGA 110 includes a gimbal 110e, a head-slider 110a coupled with the gimbal 110e. In accordance with one or more embodiments, the head-slider includes a slider 110a-1, and a magnetic-recording head 110a-2 coupled with the slider 110a-1. In accordance with one or more embodiments, the magnetic-recording head 110a-2 includes a write element 110a-21 configured to write data to the magnetic-recording disk 120, a read element 110a-22 configured to read data from the magnetic-recording disk 120. In accordance with one or more embodiments, the HGA 110 is configured to support the head-slider 110a in proximity with a recording surface of the magnetic-recording disk 120 when the magnetic-recording disk 120 is rotated by the spindle motor, and the actuator arm 134 is configured to be pivoted by a voice coil motor for accessing data on the magnetic-recording disk 120. Furthermore, in accordance with one or more embodiments, actuator arm 134 is configured with a well (e.g., 310 of FIG. 3). In accordance with one or more embodiments, a piezoelectric element is disposed in well 310 and is aligned with a neutral axis (e.g., 450 of FIG. 4) of actuator arm 134.

Figure 2:
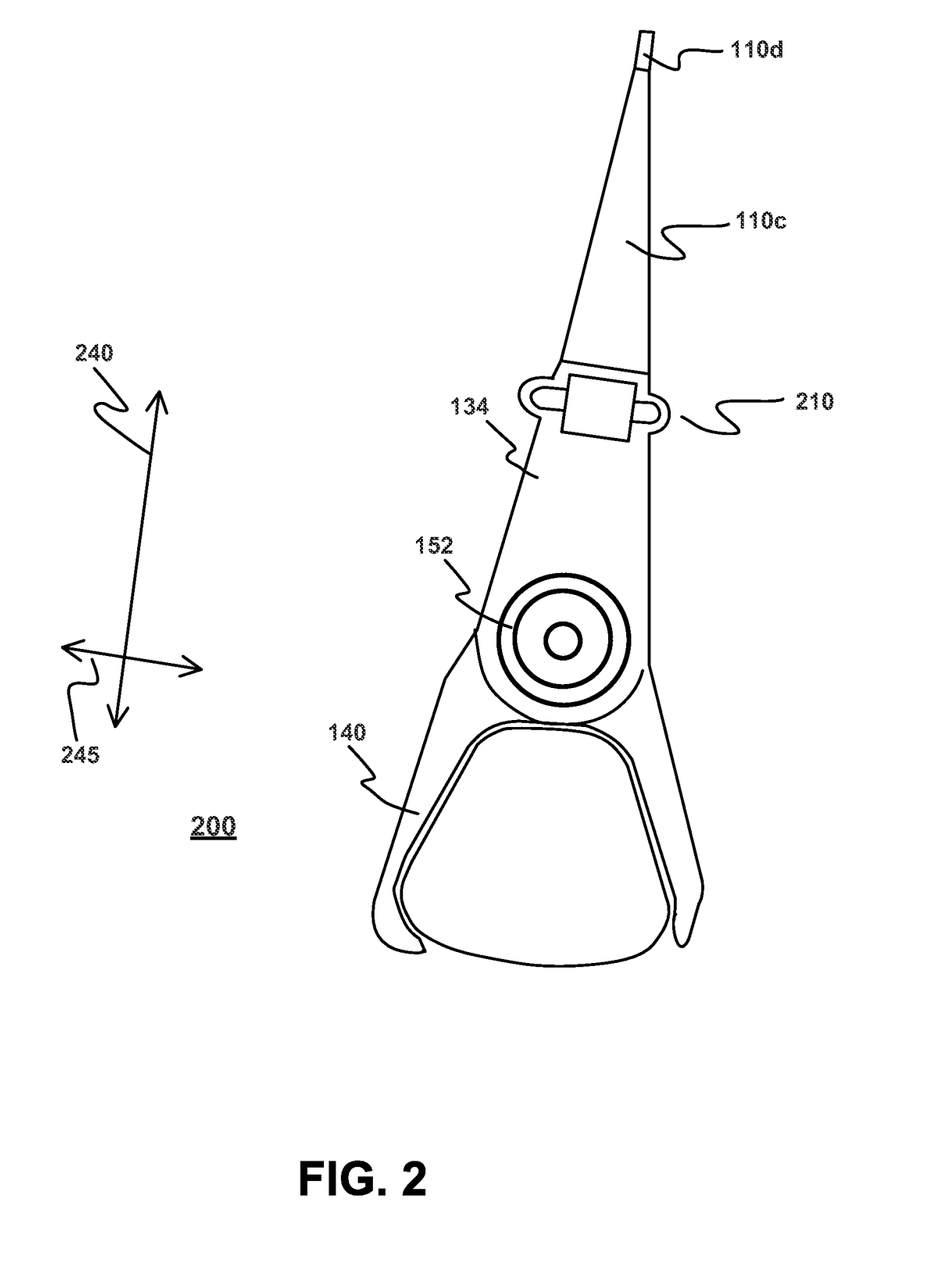
FIG. 2 is a plan view of an actuator arm assembly in accordance with an embodiment.

With reference now to FIG. 2, a plan view of an actuator arm assembly 200 in accordance with an embodiment is shown. An actuator arm 134 is coupled with a head gimbal assembly such as head gimbal assembly 110 of FIG. 1 as described above. The head gimbal assembly further comprises a tongue 110d and load beam 110c. Also shown in FIG. 2 is voice coil 140 and pivot-bearing assembly 152. In the embodiment shown in FIG. 2, a milli-actuator assembly 210 which is disposed in actuator arm 134. In one embodiment, the component shown as actuator arm 134 is also known as a stiffener.

In one embodiment, a HDD such as HDD 101 of may have a plurality of actuator arms each with the features of actuator arm 134 and each with its own head gimbal assembly, the head gimbal assemblies of the plurality of parallel actuator arms operate in unison with one another. However, in another embodiment the HDD may use multiple actuator arms configured to move independently of one another. In FIG. 2 it is noted that the term "laterally" refers to the lateral axis of arm 134 as indicated by arrow 245 while the longitudinal axis of arm 134 is indicated by arrow 240 of FIG. 2.

Figure 3:
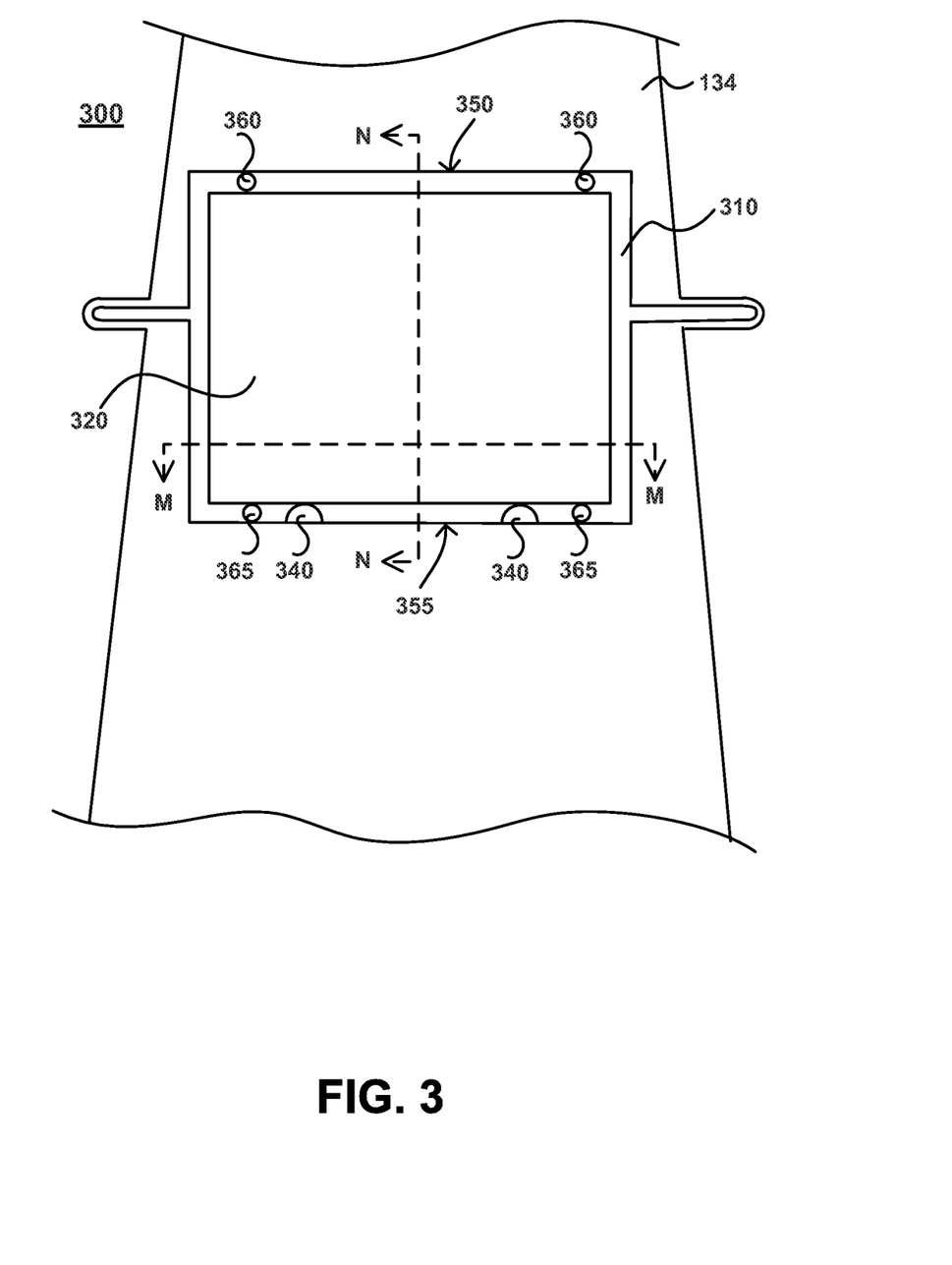
FIG. 3 is a top view of a milli-actuator assembly in accordance with one embodiment.

FIG. 3 is a top view of a milli-actuator assembly 300 in accordance with one embodiment. In the embodiment of FIG. 3, a well 310 has been created in actuator arm 134. In accordance with various embodiments, well 310 comprises an opening in actuator arm 134 which extends at least partially into actuator arm 134 itself. In one embodiment, well 310 comprises an opening which extends entirely through actuator arm 134. In FIG. 3, a piezoelectric element 320 is disposed within well 310. Piezoelectric element 320 is implemented as a milli-actuator device which expands and contracts in response to an applied voltage. In the embodiment shown in FIG. 3, piezoelectric element 320 applies mechanical force to projections 340 of actuator arm 134 which project into well 310 and to adhesive blobs 360 and 365. In so doing, the positioning of a magnetic-recording head (e.g., 110a-2 of FIG. 1) can be changed to align it more precisely with a track (e.g., 176 of FIG. 1). It is noted that projections 340 are disposed at a rear end surface 355 of well 310 along the longitudinal axis of actuator arm 134 (e.g., 240 of FIG. 2). However, there is no contact between piezoelectric element 320 at the side walls of well 310 along the lateral axis of actuator arm 134 (e.g. 245 of FIG. 2). Furthermore, embodiments are not limited to having projections, similar to projections 340, disposed at one side alone, or only at the rear end surface 355 of well 310. In one embodiment, piezoelectric element 320 comprises a lead zirconate titanate (PZT) actuator. In FIG. 3, piezoelectric element 320 is coupled with the front end surface 350 and the rear end surface 355 of well 310 using adhesive blobs 360 and 365 respectively. In one embodiment, adhesive blobs 360 and 365 comprise a viscoelastic adhesive. However, other types of adhesive can be used in various embodiments.

In accordance with various embodiments, piezoelectric element 320 is aligned with a neutral axis (e.g., 450 of FIG. 4) of actuator arm 134. The neutral axis of a beam is the axis at which compression forces and tension forces of a beam which is being bent balance each other and therefore it does not undergo extension or compression during bending. By the same reason an extension or compression of piezoelectric element 320 when aligned with the neutral axis does not produce bending of actuator arm 134 but extension or compression alone. In one embodiment, the central axis (e.g., 560 of FIG. 5) of piezoelectric element 320 is aligned with the neutral axis of actuator arm 134. In another embodiment, a neutral axis (e.g., 460 of FIG. 4) of piezoelectric element 320 is aligned with the neutral axis of actuator arm 134. In another embodiment, the neutral axis of is estimated as the neutral axis of actuator arm 134 when coupled with piezoelectric element 320 and piezoelectric element 320 is aligned with this estimated neutral axis. It is noted that in one or more embodiments, the central axis of piezoelectric element 320 corresponds to the neutral axis of piezoelectric element 320. In other words, the central axis of piezoelectric element 320 may also be the neutral axis of piezoelectric element 320. In accordance with one or more embodiments, the depth of well 310 is controlled such that when piezoelectric element 320 is placed within well 310 and rests upon the top surface (e.g., 430 of FIG. 4) of well 310, the alignment of the central axis, or neutral axis, of piezoelectric element 320 with the neutral axis 450 of actuator arm 134 occurs. However, it is noted that when piezoelectric element 320 rests upon the top surface 430 of well 310, it is not coupled with it and has freedom of motion relative to actuator arm 134 and/or top surface 430 of well 310. This freedom of motion allows the cross curvature and edge curling of the piezoelectric element 320 to develop naturally without affecting the operation of the system.

The alignment of piezoelectric element 320 with the neutral axis is advantageous in that, when piezoelectric element 320 is actuated, motion of actuator arm 134 is much more likely to be in the horizontal plane of motion with respect to a magnetic-recording disk (e.g., 120 of FIG. 1) while minimizing, or eliminating, motion of actuator arm 134 or HGA 110 in a vertical plane of motion with respect to the magnetic-recording disk. One advantage of reducing, or eliminating, motion of actuator arm 134 or HGA 110 in a vertical plane of motion is that it is less likely to change the fly-height of the slider. In some conventional implementations of a milli-actuator, the piezoelectric element can be mounted so that its central axis, or neutral axis, is not aligned with the neutral axis of the actuator arm. As a result, when the milli-actuator is actuated, it can cause a bending of the actuator arm toward or away from the face of magnetic-recording disk. Many actuator arms are fabricated with a bend which is straightened when the HDD is fabricated. This results in a pre-load force on the slider. This force is also known as the gram-load as the force is typically measured in grams. When an actuator arm is bent due to the milli-actuator not being aligned with the neutral axis of the actuator arm, the pre-loading on the slider is changed as well which in turn changes the fly-height of the slider. In accordance with one or more embodiments, when piezoelectric element 320 is aligned with the neutral axis of actuator arm 134, the movement of HGA 110 is much more within the horizontal plane of motion which results in less change in the pre-loading of the slider. As a result, the fly-height of the slider is less likely to be affected. This in turn results in faster seek times for the HDD as adjustments to the fly-height of the slider will not have to be made as a result of implementing the milli-actuator assembly 300.

Additionally, as described above, no adhesive or other coupling is implemented between the bottom of piezoelectric element 320 and the top surface (e.g., 430 of FIG. 4) of well 310 directly underneath it. In conventional mill-actuator assemblies, the piezoelectric element is glued to the well using some form of adhesive. Thus, there is a coupling of the piezoelectric element and the actuator arm itself via the top surface of the well directly underneath the piezoelectric element. This results in a transfer of shear stress on the plane of the adhesive coupling the piezoelectric element with the actuator arm due to the pre-loading force. When the conventional milli-actuator is actuated, the transfer of actuation force occurs through the adhesive layer which causes additional shear stress. Because a viscoelastic material is typically used as an adhesive between the piezoelectric element and the actuator arm, over time creeping of the viscoelastic material occurs which is similar to the relaxation of a spring which is under a load. In the case of the conventional mill-actuator, pre-load of the slider will continue to drop as a function of time and temperature. As an example, when there is a higher temperature, the viscoelastic material will relax and creep over time. As a result, the pre-load on the slider will drop over time which again affects the fly-height of the slider. This is dramatically accentuated when the operating temperature of the viscoelastic material exceeds its glass transition temperature.

An additional problem encountered in conventional milli-actuators is transversal bending of the piezoelectric element itself. When the piezoelectric element is not aligned with the neutral axis of the actuator arm, the PZT piezoelectric element not only extends and bends along its longitudinal axis, but also acquires a transversal curvature across its lateral axis. This transversal curvature is not just a Poisson ratio effect, but a nonlinear one. Since the PZT piezoelectric element is thin relative to its width, its thickness/width ratio is small and transversal curvature is exhibited more at the outer edges (e.g., at the outer edges in the lateral axis) which results in a curling or curvature at the outside edges of approximately ten percent the thickness of the PZT piezoelectric element. In a body having a greater thickness/width ratio, the curvature moves more to the center of the body. The net result is that, due in part to the pre-load, there is a curvature in the PZT piezoelectric element at the outer edges and the PZT piezoelectric element is pulling away from the actuator arm toward its center. As a result, the viscoelastic adhesive between the PZT piezoelectric element and the actuator arm will thicken over time as its volume remains constant. As a result, the resistance of the viscoelastic adhesive layer to shear forces will lower over time. This in turn exacerbates the change to the pre-load applied to the slider.

In contrast, in accordance with one or more embodiments, there is far less, or essentially no, pre-load transmitted to piezoelectric element 320 because it is aligned with the neutral axis of actuator arm 134 and because it is not coupled using an adhesive layer between the bottom of piezoelectric element 320 and the top surface of well 310. As a result, the changes to the fly-height described above can be reduced, or eliminated, in accordance with one or more embodiments.

Figure 4:
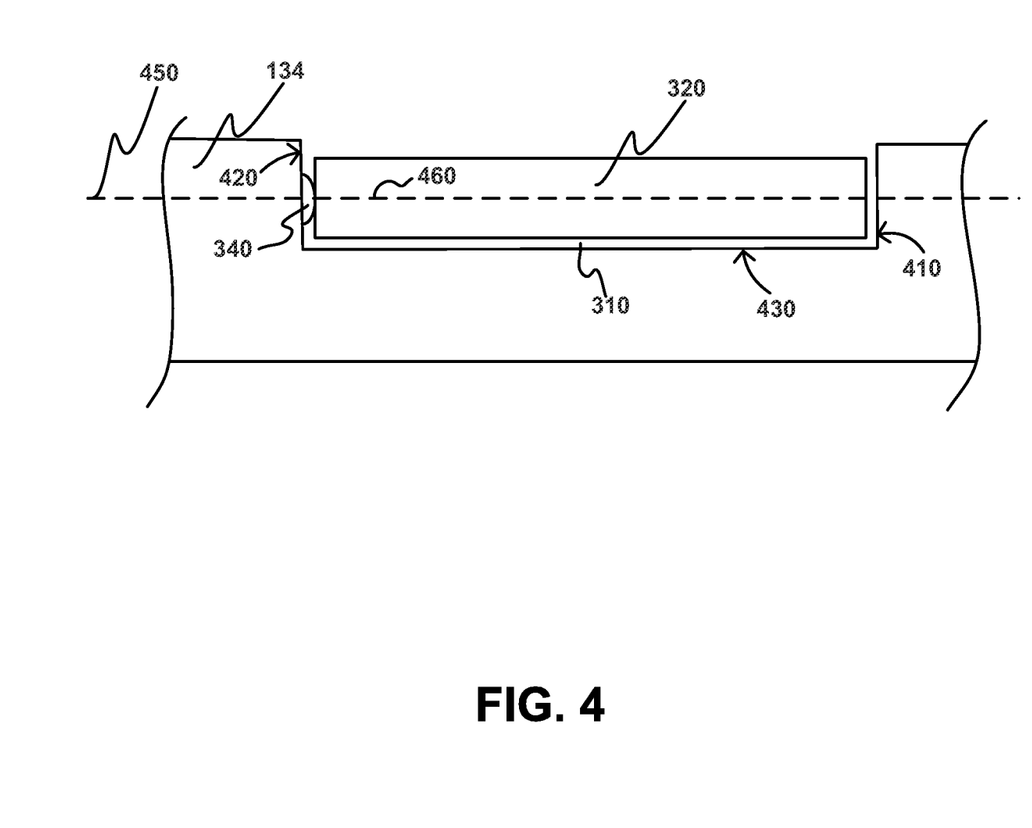
FIG. 4 is a side cross-section view of a milli-actuator assembly in accordance with one embodiment.

FIG. 4 is a side cross-section view of a milli-actuator assembly in accordance with one embodiment. It is noted that the cross-section view of FIG. 4 is taken along line N-N of FIG. 3. In FIG. 4, well 310 is shown disposed at least partially within actuator arm 134. Again, piezoelectric element 320 is disposed within well 310 such that it contacts projection 340 at the rear of well 310. It is noted that projection 340 couples piezoelectric element 320 with the rear vertical surface 420 of well 310. It is noted that in the embodiment shown in FIG. 3, that the bottom of piezoelectric element 320 is not coupled with the top surface 430 of well 310 which lies below piezoelectric element 320. In other words, there is no adhesive or other substance or device which couples piezoelectric element 320 with well 310 between the bottom of piezoelectric element 320 and the top surface 430 of well 310. FIG. 4 depicts axis 460 of piezoelectric element 320 aligned with neutral axis 450 of actuator arm 134.

Figure 5:
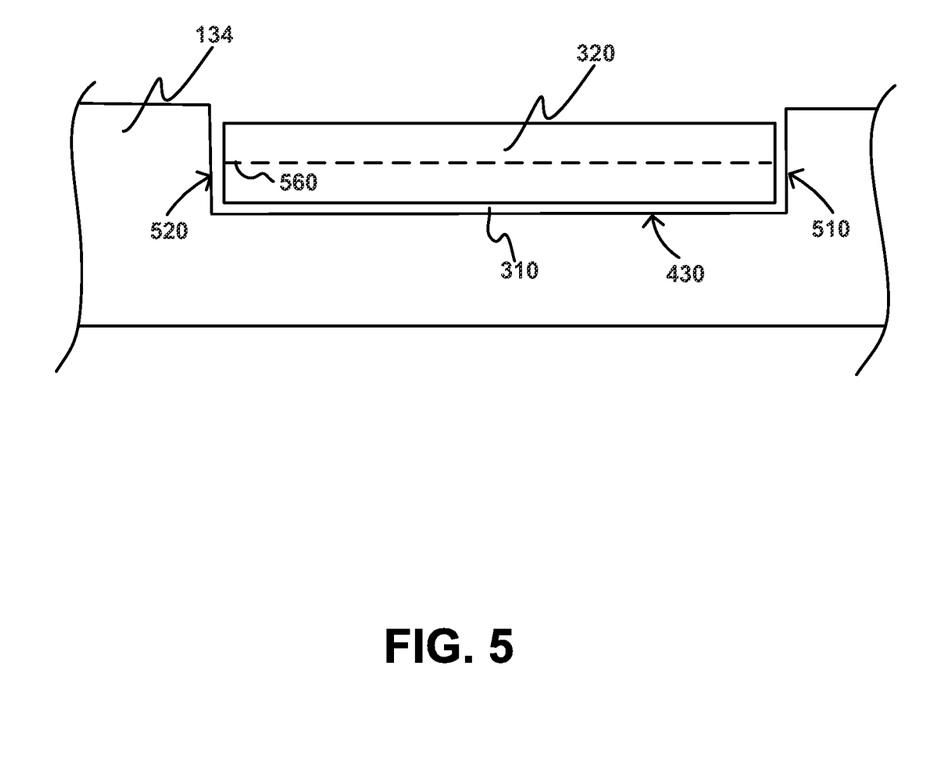
FIG. 5 is a front cross-section view of a milli-actuator assembly in accordance with one embodiment.

FIG. 5 is a front cross-section view of a milli-actuator assembly in accordance with one embodiment. It is noted that the cross-section view of FIG. 5 is taken along line M-M of FIG. 3. In FIG. 5, it is noted that piezoelectric element 320 does not contact the side walls 510 and 520 of well 310. Furthermore, it is again noted that the bottom of piezoelectric element 320 is not coupled with the top surface 430 of well 310 which lies below piezoelectric element 320. In other words, there is no adhesive or other substance or device which couples piezoelectric element 320 with well 310 between the bottom of piezoelectric element 320 and the top surface 430 of well 310.

Figure 6:
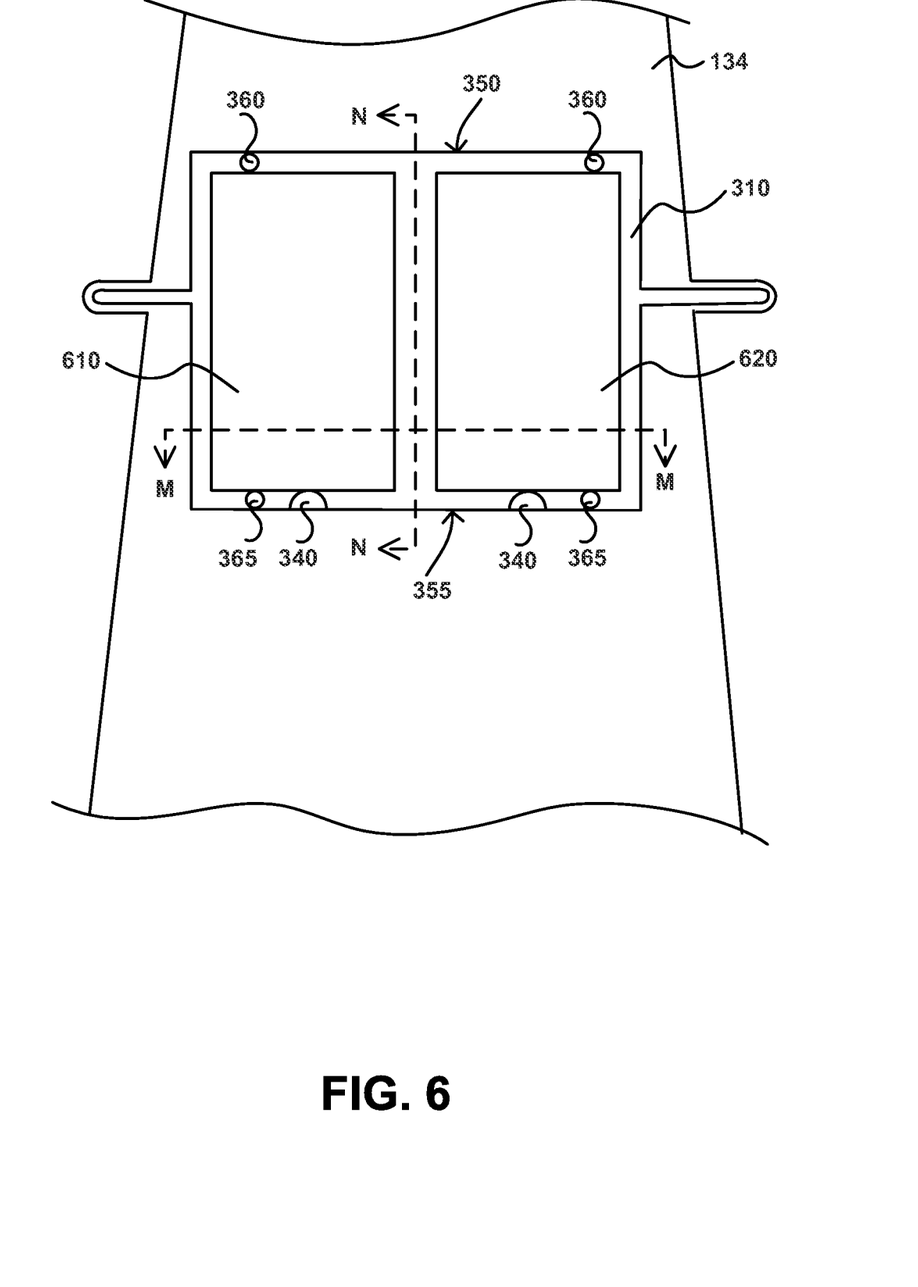
FIG. 6 is a top view of a milli-actuator assembly in accordance with one embodiment.

FIG. 6 is a top view of a milli-actuator assembly in accordance with one embodiment. In the embodiment of FIG. 6, piezoelectric element comprises a first piezoelectric actuator 610 and a second piezoelectric actuator 620. In the embodiment shown in FIG. 6, first piezoelectric actuator 610 and a second piezoelectric actuator 620 are disposed side by side laterally within well 310. First piezoelectric actuator 610 is in contact with a projection 340 respectively disposed at the rear of well 310 at its rear vertical face. Similarly, second piezoelectric actuator 620 is in contact with a respective projection 340 at the rear of well 310 at its rear vertical face. In FIG. 6, first piezoelectric actuator 610 is coupled with the front end surface 350 and the rear end surface 355 of well 310 using adhesive blobs 360 and 365 respectively. Similarly, second piezoelectric actuator 620 is coupled with the front end surface 350 and the rear end surface 355 of well 310 using adhesive blobs 360 and 365 respectively. In the embodiment shown in FIG. 6, first piezoelectric actuator 610 applies mechanical force to its respective projection 340 of actuator arm 134 which project into well 310 and to adhesive blobs 360 and 365. Also, second piezoelectric actuator 620 applies mechanical force to its respective projection 340 of actuator arm 134 which project into well 310 and to adhesive blobs 360 and 365. In so doing, the positioning of a magnetic-recording head (e.g., 110a-2 of FIG. 1) can be changed to align it more precisely with track 176. In accordance with one embodiment, first piezoelectric actuator 610 and second piezoelectric actuator 620 can be actuated independently to move HGA 110 laterally to adjust its positioning with respect to track 176. It is again noted embodiments are not limited to having projections, similar to projections 340, disposed at one side alone, or only at the rear end surface 355 of well 310.

The foregoing descriptions of specific embodiments have been presented for purposes of illustration and description. They are not intended to be exhaustive or to be limiting to the precise forms disclosed, and many modifications and variations are possible in light of the above teaching. The embodiments described herein were chosen and described in order to best explain principles and their practical application, to thereby enable others skilled in the art to best utilize various embodiments with various modifications as are suited to the particular use contemplated. It is intended that the scope be defined by the Claims appended hereto and their equivalents.

What is claimed is:

1. An actuator arm assembly for a hard-disk drive (HDD) comprising:
   an actuator arm comprising a well; and
   a piezoelectric element disposed within said well wherein said piezoelectric element is aligned with a neutral axis of said actuator arm, wherein said piezoelectric element is coupled with a first vertical surface of said well and wherein said well further comprises:
   at least one projection of said actuator arm which projects into said well from said first vertical surface and which conveys force from said piezoelectric element to said actuator arm when said piezoelectric element is actuated.

2. The actuator arm assembly of claim 1 wherein said piezoelectric element is coupled with said first vertical surface of said well using a viscoelastic adhesive.

3. The actuator arm assembly of claim 1 wherein said piezoelectric element is not coupled with a top surface of said well and has freedom of motion relative to said top surface of said well.

4. The actuator arm assembly of claim 1 wherein a neutral axis of said piezoelectric element is aligned with an estimated neutral axis of said actuator arm coupled with said piezoelectric element.

5. The actuator arm assembly of claim 1 wherein a central axis of said piezoelectric element is aligned with said neutral axis of said actuator arm.

6. The actuator arm assembly of claim 1 wherein said piezoelectric element comprises a first piezoelectric actuator and a second piezoelectric actuator.

7. A disk drive comprising:
   at least one data storage disk rotatably mounted in said disk drive; and
   a rotary actuator comprising at least one actuator arm and a load beam coupled with said at least one actuator arm, said at least one actuator arm further comprising a well and a piezoelectric element disposed within said well wherein said piezoelectric element is aligned with a neutral axis of said actuator arm, wherein said piezoelectric element is coupled with a first vertical surface of said well, wherein said well further comprises:
at least one projection of said actuator arm which projects into said well from said first vertical surface and which conveys force from said piezoelectric element to said actuator arm when said piezoelectric element is actuated.

8. The disk drive of claim 7 wherein said piezoelectric element is coupled with said first vertical surface of said well using a viscoelastic adhesive.

9. The disk drive of claim 7 wherein said piezoelectric element is not coupled with a top surface of said well and has freedom of motion relative to said top surface of said well.

10. The disk drive of claim 7 wherein a neutral axis of said piezoelectric element is aligned with an estimated neutral axis of said actuator arm coupled with said piezoelectric element.

11. The disk drive of claim 7 wherein a central axis of said piezoelectric element is aligned with said neutral axis of said actuator arm.

12. The disk drive of claim 7 wherein said piezoelectric element comprises a first piezoelectric actuator and a second piezoelectric actuator.

13. A hard-disk drive (HDD) including an actuator arm configured with a milli-actuator assembly, said HDD comprising:
a magnetic-recording disk;
a disk enclosure comprising a disk-enclosure base;
a spindle motor affixed in said disk-enclosure base, for rotating said magnetic-recording disk;
an actuator arm configured with a well and a piezoelectric element disposed within said well wherein said piezoelectric element is aligned with a neutral axis of said actuator arm and wherein said piezoelectric element is coupled with a first vertical surface of said well, wherein said well further comprises:
at least one projection of said actuator arm which projects into said well from said first vertical surface and which conveys force from said piezoelectric element to said actuator arm when said piezoelectric element is actuated;
a load beam coupled with said actuator arm; and
a HGA attached to said load beam, said HGA comprising:
a gimbal;
a head-slider coupled with said gimbal, comprising:
a slider;
a magnetic-recording head coupled with said slider, said magnetic-recording head comprising:
a write element configured to write data to said magnetic-recording disk; and
a read element configured to read data from said magnetic-recording disk.

14. The hard-disk drive of claim 13 wherein said piezoelectric element is coupled with said first vertical surface of said well using a viscoelastic adhesive.

15. The hard-disk drive of claim 13 wherein said piezoelectric element is not coupled with a top surface of said well and has freedom of motion relative to said top surface of said well.

16. The hard-disk drive of claim 13 wherein a neutral axis of said piezoelectric element is aligned with an estimated neutral axis of said actuator arm coupled with said piezoelectric element.

17. The hard-disk drive of claim 13 wherein a central axis of said piezoelectric element is aligned with said neutral axis of said actuator arm.

18. The hard-disk drive of claim 13 wherein said piezoelectric element comprises a first piezoelectric actuator and a second piezoelectric actuator.

\* \* \* \* \*